US010909176B1

United States Patent
Naeymi-Rad et al.

(10) Patent No.: US 10,909,176 B1
(45) Date of Patent: Feb. 2, 2021

(54) SYSTEM AND METHOD FOR FACILITATING MIGRATION BETWEEN ELECTRONIC TERMINOLOGIES

(71) Applicant: Intelligent Medical Objects, Inc., Northbrook, IL (US)

(72) Inventors: Frank Naeymi-Rad, Libertyville, IL (US); Regis Charlot, Lake Bluff, IL (US); Andrew Kanter, Highland Park, IL (US); Matthew Cardwell, Oak Park, IL (US); Eric Frank, Portland, OR (US); Michael Ericksen, Oak Park, IL (US); Fred Masarie, Husum, WA (US); Andre Young, Kenosha, WI (US); Gregory Aldin, Oak Park, IL (US); Curtis Winn, Attleboro, MA (US); Jose Maldonado, Chicago, IL (US)

(73) Assignee: Intelligent Medical Objects, Inc., Rosemont, IL (US)

( * ) Notice: Subject to any disclaimer, the term of this patent is extended or adjusted under 35 U.S.C. 154(b) by 992 days.

(21) Appl. No.: 14/525,809

(22) Filed: Oct. 28, 2014

(51) Int. Cl.
  *G06F 16/84* (2019.01)
  *G06F 40/157* (2020.01)

(52) U.S. Cl.
  CPC ............ *G06F 16/86* (2019.01); *G06F 40/157* (2020.01)

(58) Field of Classification Search
  CPC . G06F 17/30917; G06F 17/2276; G06F 16/86
  USPC .......................................................... 707/803
  See application file for complete search history.

(56) References Cited

U.S. PATENT DOCUMENTS

| | | |
|---|---|---|
| 5,799,268 A | 8/1998 | Boguraev |
| 5,930,788 A | 7/1999 | Wical |
| 6,055,540 A | 4/2000 | Snow et al. |
| 6,101,515 A | 8/2000 | Wical et al. |
| 6,904,432 B2 | 6/2005 | Charlot et al. |
| 7,167,858 B2 | 1/2007 | Naeymi-Rad et al. |
| 7,496,593 B2 | 2/2009 | Gardner et al. |
| 7,536,387 B2 | 5/2009 | Charlot et al. |
| 7,693,917 B2 | 4/2010 | Charlot et al. |
| 7,711,671 B2 | 5/2010 | Meyers |

(Continued)

OTHER PUBLICATIONS

Unified Medical Language Systems. Snowmed to ICD-10-CM Map. Jun. 20, 2013. 4 pages https://web.archive.org/web/20130727105209/https://www.nlm.nih.gov/research/umls/mapping_projects/snomedct_to_icd10cm.html.*

(Continued)

*Primary Examiner* — Kimberly L Wilson

(74) *Attorney, Agent, or Firm* — Quarles & Brady LLP

(57) ABSTRACT

A system and method for facilitating dictionary migration or dictionary mapping from a first vocabulary or a first dictionary of terms to a second vocabulary includes one or more computers configured to carry out the steps of mapping a subset of the first set of terms to respective terms in an interface terminology and flagging another subset as not mapped to respective terms in the interface terminology. The system then may provide suggested mappings for the non-mapped terms, relying on user-supplied indications in order to map those terms. The system and method also may map the first dictionary terms to a reference terminology, an administrative terminology, or a clinical terminology or, conversely, may use those external terminologies to assist in mapping to the interface terminology.

19 Claims, 9 Drawing Sheets

(56) References Cited

U.S. PATENT DOCUMENTS

| | | | |
|---|---|---|---|
| 7,870,117 B1 | 1/2011 | Rennison | |
| 8,346,804 B2 | 1/2013 | Phillips | |
| 2002/0128861 A1 | 9/2002 | Lau et al. | |
| 2003/0126559 A1* | 7/2003 | Fuhrmann | G06F 9/454 |
| | | | 715/229 |
| 2003/0179228 A1 | 9/2003 | Schreiber et al. | |
| 2005/0027566 A1* | 2/2005 | Haskell | G06F 17/2735 |
| | | | 705/2 |
| 2005/0240572 A1 | 10/2005 | Sung et al. | |
| 2006/0069677 A1 | 3/2006 | Tanigawa et al. | |
| 2007/0050326 A1* | 3/2007 | Budhabhatti | G06F 16/902 |
| 2007/0179776 A1 | 8/2007 | Segond et al. | |
| 2008/0005168 A1* | 1/2008 | Huff | G06Q 10/109 |
| 2008/0065452 A1 | 3/2008 | Naeymi-Rad et al. | |
| 2008/0306926 A1 | 12/2008 | Friedlander et al. | |
| 2009/0083231 A1 | 3/2009 | Eberholst et al. | |
| 2009/0254572 A1 | 10/2009 | Redlich et al. | |
| 2010/0169299 A1 | 7/2010 | Pollara | |
| 2010/0204981 A1* | 8/2010 | Ribeiro | G06F 17/289 |
| | | | 704/8 |
| 2010/0262659 A1 | 10/2010 | Christiansen et al. | |
| 2011/0066425 A1 | 3/2011 | Hudgins et al. | |
| 2011/0138050 A1 | 6/2011 | Dawson et al. | |
| 2011/0184960 A1 | 7/2011 | Delpha et al. | |
| 2012/0179696 A1* | 7/2012 | Charlot | G06F 17/30731 |
| | | | 707/750 |
| 2012/0215560 A1* | 8/2012 | Ofek | G06F 19/322 |
| | | | 705/3 |
| 2014/0129535 A1* | 5/2014 | Riley | G06F 17/30864 |
| | | | 707/706 |
| 2014/0299157 A1* | 10/2014 | Song | B41J 2/16532 |
| | | | 134/18 |

OTHER PUBLICATIONS

Wade, Geraldine. "Experiences mapping a legacy interfcae terminology to SNOMED CT." BMC Medical Informatics and Decision Making. Oct. 27, 2008. 6 pages https://bmcmedinformdecismak.biomedcentral.com/track/pdf/10.1186/1472-6947-8-S1-S3?site=bmcmedinformdecismak.biomedcentral.com.*

"Semantic Web: Asking the Right Questions," Duch et al., Seventh International Conference on Information and Management Sciences, Urumchi, China, Aug. 12-19, 2008 entire document www.fizyka.umk.pl/ftp/pub/papers/kmk/08-SemWeb.pdf.

Virginia Tech SNOMED Core Structures 2nd AAHA Software Vendors Summit, Apr. 21, 2009.

"Social tagging overview (SharePoint Server 2010)" May 12, 2010 entire document http://technet.microsoft.com/en-us/library/ff608137.aspx.

Bronnert et al., Problem-Centered Care Delivery, Journal of ANIMA 83, No. 7 (Jul. 2012): 30-35.

* cited by examiner

FIG. 3

| Select | Mnemonic/Print # | Description | IMO normalized description | IMO status | IMO mapped description | Last note | Custom |
|---|---|---|---|---|---|---|---|
| ☐ | 150.3215? | BRAIN NATRIURETIC PEPTIDE | brain natriuretic peptide | mapped | brain natriuretic peptide | | Not Re |
| ☐ | 150.32157 | BRAIN NATRIURETIC PEPTIDE | brain natriuretic peptide | Mapped | brain natriuretic peptide | | Not Re |
| ☐ | 150.32157 | BRAIN NATRIURETIC PEPTIDE | brain natriuretic peptide | Mapped | brain natriuretic peptide | | Not Re |
| ☐ | 750.29750 | BROMIDE | bromide measurement | Mapped | bromide measurement | | Not Re |
| ☐ | 750.29750 | BROMIDE | bromide measurement | Mapped | bromide measurement | | Not Re |
| ☐ | 750.29750 | BROMIDE | bromide measurement | Mapped | bromide measurement | | Not Re |
| ☐ | 150.13000 | BUN | BUN | Mapped | BUN | ◊ | Not Re |
| ☐ | 150.13000 | BUN | BUN | Mapped | BUN | ◊ | Not Re |

Concept Code

Candidate concepts | Search concepts | IMO sleeve codes* | Customer codes* | Customer additional data*

← 20

1 customer codes found

| Vocab | Code | Description |
|---|---|---|
| CPT4 | 84311 | Spectrophotometry, analyte not elsewhere specified |

FIG. 4

| Select | Mnemonic/Print # | Description | IMO normalized description | IMO status | IMO mapped description | Last note | Custom |
|---|---|---|---|---|---|---|---|
| ☐ | 150.3433/ | BRAIN NATRIURETIC PEPTIDE | brain natriuretic peptide | Mapped | brain natriuretic peptide | | Not Re |
| ☐ | 150.32157 | BRAIN NATRIURETIC PEPTIDE | brain natriuretic peptide | Mapped | brain natriuretic peptide | | Not Re |
| ☐ | 150.32157 | BRAIN NATRIURETIC PEPTIDE | brain natriuretic peptide | Mapped | brain natriuretic peptide | | Not Re |
| ☐ | 750.29750 | BROMIDE | bromide measurement | Mapped | bromide measurement | | Not Re |
| ☐ | 750.29750 | BROMIDE | bromide measurement | Mapped | bromide measurement | | Not Re |
| ☐ | 750.29750 | BROMIDE | bromide measurement | Mapped | bromide measurement | | Not Re |
| ☐ | 150.13000 | BUN | BUN | Mapped | BUN | * | Not Re |
| ☐ | 150.13000 | BUN | BUN | Mapped | BUN | * | Not Re |

Page 4 of 17  Page Size: 200  Concept  601 - 800

Concept Code:

Candidate concepts | IMO shortved codes* | Customer codes* | Customer additional data*

Concept Code: 338729697  Load

& codes associated with IMO mapped description | & codes associated with Customer mapped IMO description

| Vocab | Code | Description | Preferred Flag | Vocab | Code | Description | Preferred Flag |
|---|---|---|---|---|---|---|---|
| CPT4 | 80299 | Quantitation of drug, not elsewhere specified | preferred primary | | | | |
| SNOMED CT | 58466009 | Bromides measurement (procedure) | preferred primary | | | | |
| LOINC | 1984-4 | Bromide:MCnc:Pt:Ser/Plas:Qn | preferred primary | | | | |

FIG. 5

| Concept Code | 487122 | × 🔍 ▷ | Concept | blood oxygen saturation measurement | | | |
|---|---|---|---|---|---|---|---|
| Candidate concepts* | Search concepts | IMO derived codes | Customer codes | Customer additional data* | | | |
| 3 candidates found ordered by strength of match | | | | 19 codes associated with IMO mapped description | | | |
| Description | | | | Vocab | Code | Description | Preferred Flag |
| O2 saturation | | | | | | Oxygen saturation results documented and reviewed | |
| iron saturation % | | | | | | | |
| transferrin saturation | | | | | | | |

☐ Map to import term
☐ Map to all selected import term(s)

SYSTEM AND METHOD FOR FACILITATING MIGRATION BETWEEN ELECTRONIC TERMINOLOGIES

FIELD OF THE DISCLOSURE

This disclosure relates to systems and methods for electronic terminology management and migration.

BACKGROUND OF THE DISCLOSURE

Terminology is a set of descriptions used to represent concepts specific to a particular discipline. It also is the foundation of electronic health record ("EHR") data. For example, the terms "heart attack" and "MI" may be used to describe the same concept of myocardial infarction. The concept in turn may be associated with codes that are used for a variety of purposes.

Different healthcare terminologies may have their own unique features and purposes. For example, one set of terminologies, RxNorm, encodes medications, while another set of terminologies, e.g., Logical Observation Identifiers Names and Codes (referred to under the trademark "LOINC"), is used for laboratory results and observations.

Categories or terms related to terminology include: Administrative code sets; Clinical code sets; and Reference terminologies.

Administrative code sets are designed to support administrative functions of healthcare, such as for reimbursement, reporting and other secondary data aggregation. Common examples are the International Classification of Disease (ICD) and the Current Procedural Terminology, which is referred to via the trademark CPT held by the American Medical Association (AMA). Each code system may be different, e.g., ICD's purpose is to aggregate, group, and classify conditions, whereas CPT is used for reporting medical services and procedures.

Clinical code sets have been developed to encode specific clinical entities involved in clinical work flow, such as LOINC and RxNorm. Clinical code sets have been developed to allow for meaningful electronic exchange and aggregation of clinical data for better patient care. For example, sending a laboratory test result using LOINC facilitates the receiving facility's ability to understand the result sent and make appropriate treatment choices based upon the laboratory result.

A reference terminology may be considered a "concept-based, controlled medical terminology." The Systematized Nomenclature of Medicine Clinical Terms (referred to under the trademark "SNOMED CT") is an example of this kind of terminology. It maintains a common reference point in the healthcare industry. Reference terminologies also identify relationships between their concepts. Relationships can be hierarchically defined, such as a parent/child relationship. The reference terminology contains concept A and concept B, with a defined relationship of B as a child of A. SNOMED CT includes concepts such as heart disease and heart valve disorder, and their defined relationship identifies heart valve disorder as a child of heart disease.

In one aspect, clinical code sets may be considered a subset of reference terminologies. As such, the two code sets may be discussed herein separately or jointly, with the understanding that reference terminologies also may refer to elements described above as being part of a clinical code terminology.

Exemplary methods for mapping iterations of a terminology, e.g., to migrate from ICD-9 to ICD-10, or mapping between various terminologies, e.g., administrative, clinical, or reference terminologies, with the assistance of a mapping to an interface terminology, are provided in the commonly-owned U.S. publication 2014/0122117, the contents of which are incorporated by reference.

BRIEF SUMMARY

In one aspect, a method for facilitating dictionary migration or dictionary mapping from a first vocabulary to a second vocabulary may include the steps of: determining a domain for which a first set of terms stored in a database on a computer in the first vocabulary belong; mapping a subset of the first set of terms to respective terms in an interface terminology; flagging another subset of the first set of terms as not mapped to respective terms in the interface terminology; providing suggested mappings for a plurality of the other subset of terms; receiving a user indication of a desired mapping for the plurality of the other subset of terms; and mapping the plurality of the other subset of terms to respective terms in the interface terminology.

The first vocabulary may be extracted from a health information system such as an electronic health record, and both vocabulary and mappings may be exported back to the health information system, e.g., back into the EHR for implementing the mappings.

The method also may include mapping at least some of the subset of the first set of terms and at least some of the plurality of the other subset of terms to a reference terminology, an administrative terminology, or a clinical terminology. Additionally, the domain may be determined based on an identification of the reference, administrative, or clinical terminology, i.e., the domain may be pre-selected based on a previous mapping to a known code or code set.

The method also may include the steps of generating a new interface terminology term and mapping the new interface terminology term to a term in the first vocabulary. The new interface terminology term may be a description that relates to an existing interface terminology concept or, alternatively, a description that relates to a newly generated interface terminology concept.

Still further, the method may include the step of presenting the user with a web-based, user-facing interface that includes a first portion displaying a plurality of terms in the first vocabulary and a second portion responsive to a user selection in the first portion. The providing step then may include the second portion displaying suggested interface terminology mappings for the selected term, and the receiving step may include receiving a user selection of one of the suggested interface terminology mappings or a user-suggested mapping.

In another aspect, a method for facilitating data migration from a first vocabulary to a second vocabulary may include the steps of presenting a user with a web-based, user-facing interface that includes a first portion displaying a plurality of terms in the first vocabulary and a second portion responsive to a user selection in the first portion, providing, in the second portion, suggested interface terminology mappings for the selected term, receiving a user selection of one of the suggested interface terminology mappings or a user-suggested mapping, and confirming the user selection or user-suggested mapping. Prior to the presenting step, the method also may include the steps of mapping a subset of the first vocabulary to respective terms in an interface terminology prior to the presenting step and flagging a subset of the first vocabulary as not mapped to respective terms in the interface terminology.

The method additionally may include the step of analyzing, by a computer, terms of the first vocabulary stored in a database, to determine to which domain of the interface terminology they belong.

Moreover, upon confirming a user-suggested mapping, a new interface terminology description may be added, for use in mapping just for that user's first vocabulary library or for use in mapping multiple users' libraries.

Still further, the method may include the step of mapping at least some of the first vocabulary terms to reference terminology terms, administrative terminology terms, and/or clinical terminology terms, via interface terminology mappings.

BRIEF DESCRIPTION OF THE DRAWINGS

FIG. 3 is another view of a user interface for carrying out a portion of the data reconciliation.

FIG. 4 is another view of a user interface for carrying out a portion of the data reconciliation.

FIG. 5 is another view of a user interface for carrying out a portion of the data reconciliation.

FIG. 6 is a view of a portion of a user interface for carrying out a portion of the data reconciliation.

FIG. 7 is another view of a portion of a user interface for carrying out a portion of the data reconciliation.

DETAILED DESCRIPTION

Figure 1:
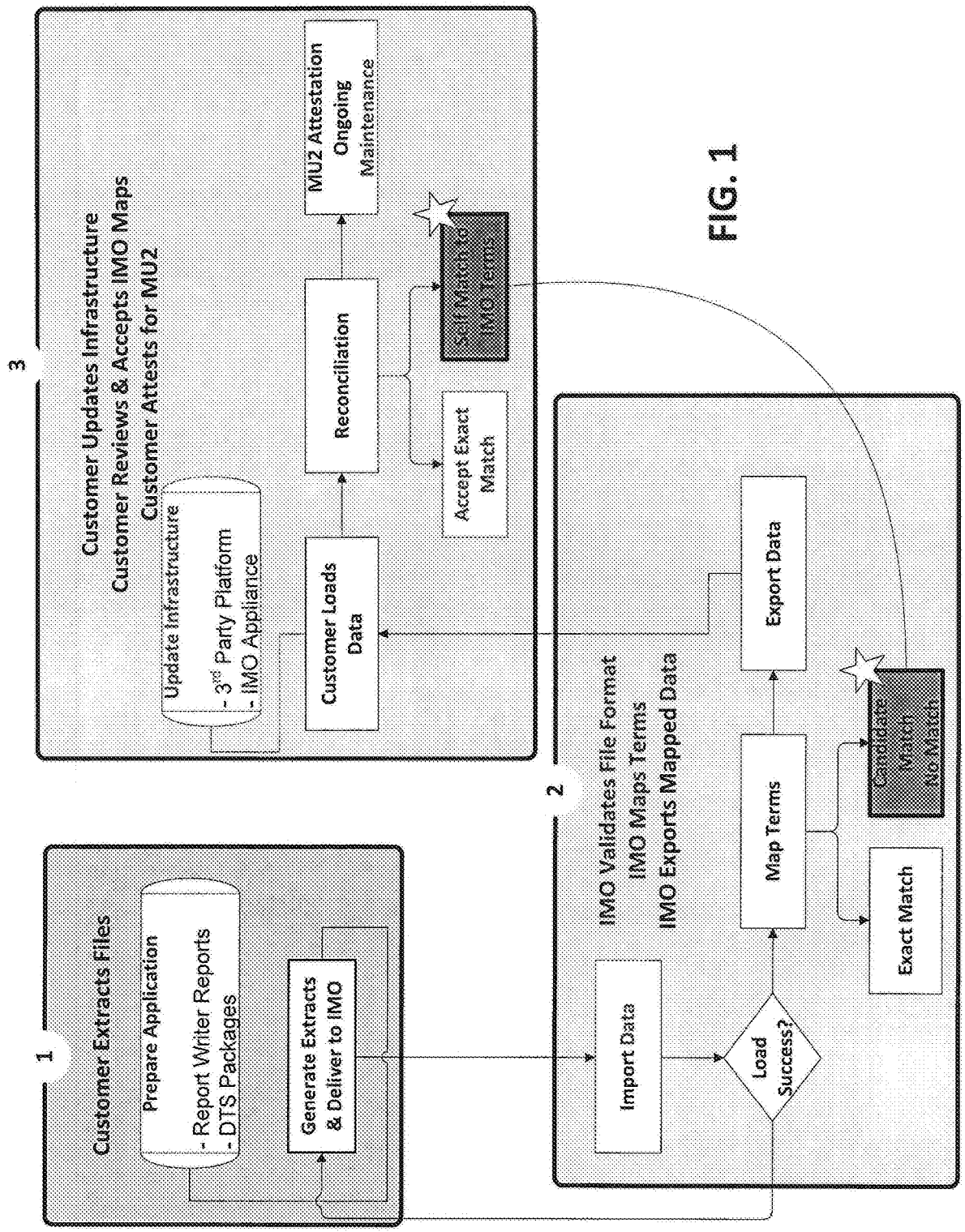
FIG. 1 is a high-level schematic of a process for data mapping and reconciliation.

A method and system of using one or more computers having one or more processors for supporting and simplifying mapping or migration from one electronic terminology to another is provided. One reason for this mapping is to provide a curated terminology service where local dictionary terms can be mapped to reference terminologies like SNOMED CT®, LOINC® and RxNORM, in addition to administrative code sets such as ICD-9-CM, ICD-10-CM and various HL-7 terminologies. These code mappings can be used for reporting for Meaningful Use, Clinical Quality Measures, or other reporting requirements, research, decision-support, and even billing.

As stated above, methods and systems exist for mapping between multiple terminologies, e.g., mapping from a reference (or clinical) or administrative terminology to an interface terminology. Interface terminologies are designed to capture terms and phrases at the correct level of specificity to be of use to clinical providers. Examples include IMO's Problem IT® and Procedure IT®. Interface terminologies may be mapped to administrative and reference terminologies to provide a bridge between clinical users and the functions provided by those other terminologies. Mapping directly between such terminologies, mapping one of those terminologies to a proprietary terminology other than the interface terminology, or confirming those mappings may be considered "reconciling" the terminologies.

An interface terminology may include multiple components, including: Domains, Concepts, and Descriptions. There may be relationships among elements within each of these components, as well as between elements within each component, which may be described as granularity. More information about interface terminology may be found in the commonly. owned U.S. publications 2012/0179696 and 2014/0122117, the contents of which are incorporated herein by reference.

Domains

A domain may be the uppermost level of the hierarchy. Each domain may be a container for one or more concepts.

Domains may include, e.g., problems/diagnoses, procedures, medidations, non-medication allergies, observables, result values, etc.

Concepts

Concepts are below domains in the hierarchy and may be considered containers for descriptions. A concept may define a clinical finding and may be a fully, well-defined expression of clinical intent. It may be unambiguously defined and may reside within a single domain.

A concept may be a coded entity with unique semantics. While concepts may reside higher up in the order of terminology specificity, concepts preferably are specific enough to provide accurate, unambiguous and unique terminology for a user.

Adding a concept may require creating a concept description (more specific) and domain (more general) for the concept. The concept description may be added as a default description for the new concept. Each concept description preferably is unique for the domain to which the concept pertains, although a single concept may appear in multiple domains (hence making them unique).

Descriptions

Descriptions may be a collection of text strings or terms and may represent alternative ways to express a concept, which may allow the system to capture concepts in the terms that various, varied practitioners may use. Multiple descriptions may map to a concept, but each description preferably has the same meaning. For each concept, there may be one or more preferred descriptions. For example, there may be at least one of a preferred clinician and a preferred patient term, in order to capture both clinical intent and an explanation understandable by the lay patient. Preferred terms may be called out with the use of flags to the respective entries.

It may become necessary to determine whether a new term is a description within an existing concept or whether it merits the creation of a new concept. This determination may be driven by an iterative, editorial process. Preferably, the determination is based on an understanding of clinical science, such that creation of a new concept results from a clinical understanding of its difference as compared to existing concepts.

Each concept may include a default description, and the system may include an editing module in order facilitate changing this description. A default description may be selected, e.g., by receiving a user selection, and it may be the description that is mapped to a concept and has a CONTEXT_ID equal to some predetermined value, e.g., 1. While descriptions may be deleted, the system may prevent the deletion of a default description, at least until a new default description has been established.

Multiple descriptions may be associated with each concept. Descriptions are associated with lists of words. Separate and apart from interface terminology mappings, each concept may map to one or more external codes, such as an administrative term code, a clinical term code, and/or a reference terminology code. These words may include the words that map to descriptions from a table such as the DESCRIPTION_WORD_MAP table. They also may include words that map to words in one or more other tables, such as a WORD_GROUP table, which may include other variations around the word, e.g., plural forms and misspellings.

Concepts are unique within a domain, and the same description is not used more than once across all concepts within a single domain. Thus, the system may allow the user to leverage existing descriptions to form the basis for new descriptions. For example, the system may include a graphical user interface that allows the user to select an existing description within a separate concept and to populate fields relating to the description in the new concept with those from the existing descriptions. Similarly, selecting an existing description within the same concept or a different concept may generate a list of suggested descriptions to be added based on word equivalence. Moreover, instead of copying a description from one concept to another, the system may allow the user to move a description between concepts.

Without context, a description may not provide the user with full understanding of what it represents, since the description may be related to multiple concepts. For example, acronyms may be included as descriptions, and while the acronym MI may refer to myocardial infarction or mitral insufficiency, descriptions may be "MI (myocardial infarction)" and "MI (mitral insufficiency)," which may be referred to as disambiguation, since the appended portion clarifies to which concept the description belongs. Even if the same description is used in multiple concepts, preferably the system includes a separate instance of that description for each concept. For example, two concepts may include the description "MI," but those descriptions are linked to their own concepts, i.e., there is no description that shows a relationship with two separate concepts.

Mapping methods may be automated in order to take advantage of the speed and accuracy that computer implementation provides. At the same time, the mapping process may be a conceptual one, the purpose of which may be to bridge between a user's dictionary item and a medical concept contained within the mapped dictionary, either creating a new mapping or confirming the accuracy of an existing mapping. As times, no direct mapping matches with terms in the mapping dictionary, i.e., the interface terminology, may exist, such that the system may not match exactly the term found in the user's dictionary, or it may be unable to determine a matching term.

Thus, even with automated reconciliation, there may be situations in which one or more terms cannot be mapped automatically with a required confidence level, such that third party human interaction is required. As described herein, the current system and method seek to simplify and to minimize the amount of third party interaction that is required to complete the mapping.

Accordingly, and with reference to FIG. 1, a system including one or more computers having one or more processors may be configured to receive data files extracted from a third party EHR or other health information ("HIT") application, as at step 1. These data files may include elements that herein may be referred to as "dictionary terms." A dictionary may be considered a grouping of terms with a focused collection and purpose, as compared to a vocabulary, which may be an organization of terms with multiple purposes.

It will be understood that an entire dictionary may be imported from the third party or extracted from the file(s) sent from the third part. Alternatively, only a portion of the dictionary may be imported or may be extracted from the received file(s). For example, a subset of the dictionary that is tied to a specific domain, e.g., problems or diagnoses, may be imported or extracted.

In addition to the dictionary terms, the received data file may include mappings between the dictionary terms and elements of one or more external code sets, although these mappings may be incomplete or may not be the most accurate mappings.

At step 2, the computer may be configured to execute a software module to process the files and make a first pass at mapping the dictionary terms in the EHR or HIT application to a mapping terminology, e.g., an interface terminology. First, each dictionary may map to a system domain in order to define the metes and bounds of the mappings, i.e., the system may look only to concepts contained within that domain. Dictionary terms may map to concepts in a different domain but, as a result of this first step, may be classified by the system as "Do Not Migrate" or "DNM" terms.

After extracting the data and prior to making the first pass, e.g., between the "load success" and "map terms" elements in step 2 of FIG. 1, the data may be standardized, normalized, or otherwise modified. Standardization may include transformations such as standardization of text (translating to lowercase or first word capitalized, e.g.), removal of extra characters, corrections of misspellings, etc. In one aspect, misspellings may be added to a list of descriptions associated with an interface terminology concept to which the dictionary term eventually is mapped. Normalization may include appending or removing laterality (e.g., left/right, anterior/posterior, etc.).

Other modifications may include analyzing metadata transmitted and associated with the third party and using elements of that metadata to provide greater specificity to the dictionary terms. For example, in a procedures domain, a third party dictionary term may be "ankle" but the associated metadata may indicate that it relates to a CT scan. Thus, this data element may be modified to indicate that it relates to a CT scan of the ankle or, if laterality is appended, to a CT scan of the left or right ankle, as appropriate. In this way, chances of providing an accurate mapping during the first pass are increased.

This normalized, modified data may be inserted into a flattened table in a database structure, which may enhance the speed and efficiency of the mapping process by reducing or eliminating a need to call multiple tables, as may occur in a relational database structure.

Mappings may be either to concepts or descriptions of the interface terminology, although the analysis between the user dictionary term and the interface terminology elements preferably is at a description level of the interface terminology, since the descriptions provide greater granularity for each concept. Exemplary methodology for determining mappings may be found in the commonly owned U.S. Publication 2012/0179696.

In the event that a match is determined during this first pass, the system may map the dictionary term to an interface terminology description. This may be a conceptual map, which means that the dictionary term and the description may not match exactly. Instead, it is an indication that the terms mean the same thing conceptually and may have the same reference maps to external (e.g., administrative, clinical, or reference terminology) elements.

As a result of this first pass, dictionary terms may or may not be mapped initially and may be classified as being unaddressed, mapped (exact or single best match, i.e., where dictionary and mapping terms differ but have the same meaning), or DNM. Thus, mapping in this initial pass may be considered a possible ultimate mapping, and it may be subject to verification, as discussed below.

DNM terms may not be mapped for several reasons, including that the term is unclear, is nonsensical, is not in scope for the mapping (i.e., is in a different domain, as discussed above), or does not require a map. DNM terms may or may not have potential candidates for the customer to choose from.

At step 3, the computer may return at least some of the terms back to the user's computer system for verification and/or reconciliation. Alternatively, the mappings may remain on the mapping entity's system, and the user may be provided with credentials to access the system (e.g., remotely) in order to undertake the verification and/or reconciliation prior to the system exporting any mapped data back to the user. Thus, either third party software or the data mapping software alternatively may be used to analyze and verify the mappings.

In one aspect, the user may be requested to verify the mapping of all terms, including those for which the system determined sufficiently confident mappings. Alternatively, the system may transmit or present a subset of the dictionary terms, e.g., the DNM terms, to the user for reconciliation, thereby greatly reducing the workload placed on the user. The system further may reduce the burden on the user by presenting the DNM terms along with one or more suggested mappings for at least some of those terms. Thus, one purpose of the system and method may be to address the DNM terms whenever possible in order to map those terms to an interface terminology (either suggested by the system as part of the first pass or by the user during the user's review), and a second purpose may be to speed approval of existing maps from the dictionary terms to another terminology, via the interface terminology, in order to speed up the reconciliation process.

In another aspect, the reconciliation of step 3 may occur in two stages. First, the user may process at least some of the terms through a reconciliation tool, which may be an external tool, to take a second pass at automated mapping. All terms may be passed through the tool, e.g., as a "double-check" to the first pass. Alternatively, the user may pass only DNM terms through the tool, thereby substantially reducing the processing time and burden of the second pass. The second stage then may include a manual review.

User actions on dictionary rows may enhance the processing of dictionary files. Mapping of unclear or out of scope rows may be one concern, but acceptance of existing maps or remaps also may speed the import procedure. For example, accepting a system-generated status of Unclear, Out of Scope, or Inappropriate laterality effectively may remove the row from the reconciliation file, reducing the number of terms the user needs to review and reconcile. A benefit of this process may be the effective elimination of the inappropriate laterality rows, which easily can number in the thousands. User-mapping of a dictionary item to a system concept may result in the status of the item automatically being changed to Mapped.

In order to achieve the reconciliation in step 3, the system may include a web-based, user-facing mapping tool, i.e., it may not require a thick client implementation, although such an implementation is possible. The tool may present the user with some or all of the terms for which mapping was not accomplished in step 2, e.g., the DNM terms, along with one or more suggested interface terminology terms for mapping to the DNM terms. This subset of terms preferably is significantly smaller than the entire dictionary being migrated, resulting in greater efficiency for both the central computer system and the third party user.

Figure 2:
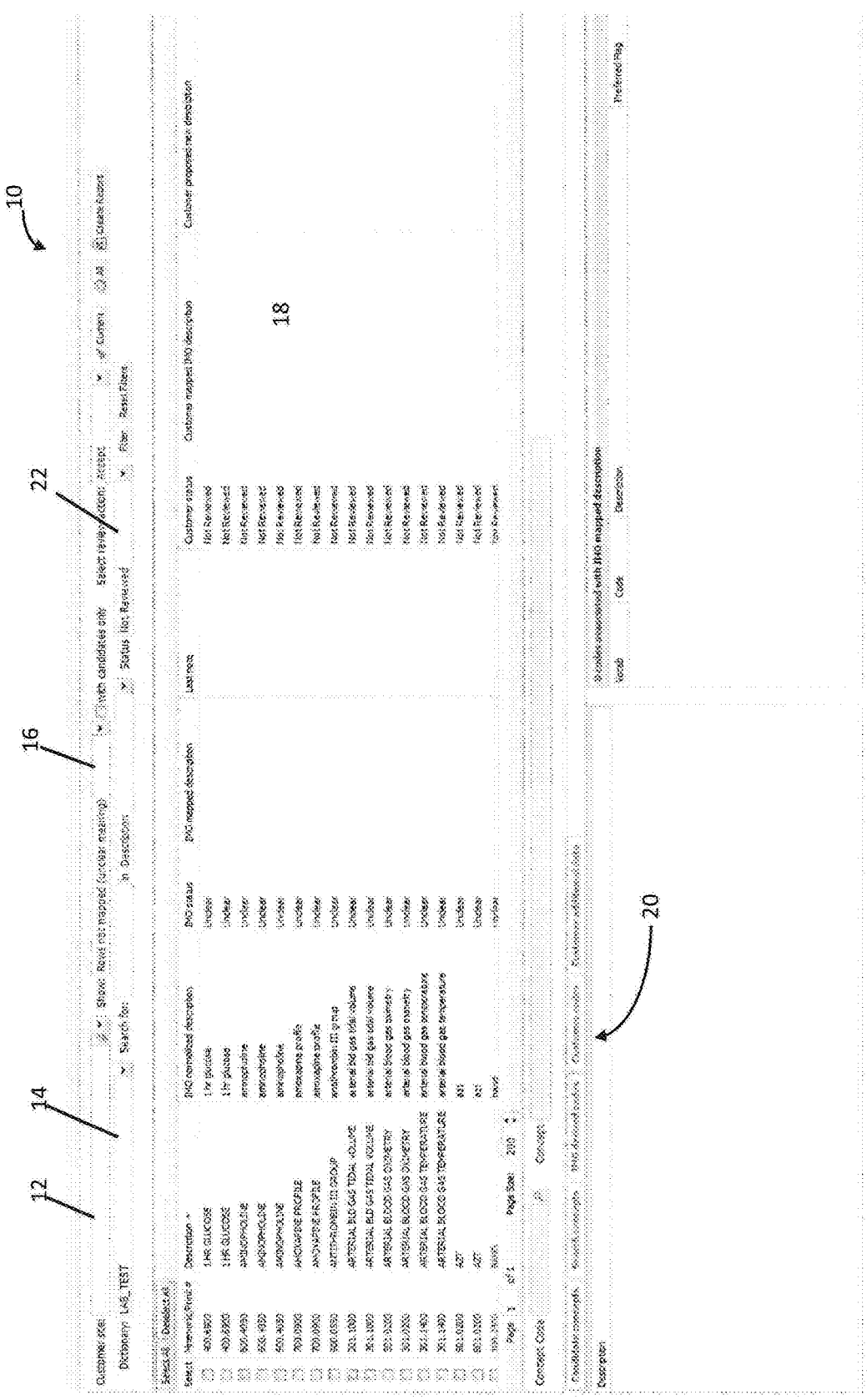
FIG. 2 is one view of a user interface for carrying out a portion of the data reconciliation.

Turning now to FIG. 2, one exemplary screenshot of the mapping tool or interface 10 is depicted. The interface may include a first dropdown 12 allowing the user to select the customer site being mapped, a second dropdown 14 allowing the user to select a dictionary to be mapped, and a third dropdown 16 allowing the user to filter the dictionary items by mapping status. In addition, the interface may include a grid 18 such as a top level grid that displays dictionary items filtered, e.g., by one or more of the above. The interface further may include a control 20 such as a lower tabbed control in order to provides additional information about the dictionary row selected by the user, as described below.

In certain cases, the user may have access to multiple sites having dictionaries to be migrated. The customer site selection dropbox 12 may permit the user to select from among those dictionaries. In the event that the user has access to one site only, that site may be selected automatically.

After selecting a site, the user then may select a dictionary to review as at dropbox 14. Again, if the user has access to one dictionary only within the selected site, that dictionary may be selected automatically.

Once the user selects a dictionary, the mapping tool may present one or more rows of entries to the user, e.g., at grid 18. The tool may default to presenting to the user rows that were flagged during the first pass as being unclear for one reason or another.

There may be several ways to filter the display of rows within a given dictionary that are presented to the user. For example, the following options may be available at the filtering dropdown 16: (a) all rows processed by the system; (b) mapped rows; (c) rows not mapped (unclear meaning); (d) rows not mapped (out of scope); (e) rows not mapped (invalid laterality); (f) rows with more than one derived external code match; (g) default rows without a single suggested external code; and (h) rows unaddressed.

Option (a) may present the user with all dictionary items that have been processed by the system, i.e., rows that the system mapped in the first pass plus rows that were flagged indicating that the system could not map them based on available information. Unaddressed rows may not be included, and therefore may not be presented, when this option is selected.

Option (b) may present the user with the entries that the system mapped during the first pass. While possible to modify these mappings, such modifications may not be likely due to the accuracy of the interfacing mapping being performed, such as the mapping described in the co-owned, co-pending U.S. publication 2014/0122117. Thus, this presentation may be useful to both the system and the user for easy, rapid validation and approval of those mappings.

Option (c) may present the user with those dictionary terms that the system could not map, because it determined that the terms were unclear, ambiguous, or otherwise not mappable. As described below, the system may provide the user with additional information so as to permit the efficient mapping and reconciliation of these terms.

Option (d) may present the user with those dictionary terms that may be clear or unambiguous to the system but that are outside the domain of the dictionary being mapped. For example, the terms may fall within a problem domain but the system may be analyzing procedure domain-based terms at the moment.

Option (e) may present the user with those dictionary terms that the system determined were created electronically by appending laterality to an existing procedure, thereby creating one with an inappropriate laterality. Such items generally are considered nonsensical, and they may be presentable to the user for quick, efficient viewing and the user's agreement to remove them from a reconciliation file.

Option (f) applies to dictionaries that require mapping to a specific external, i.e., non-interface terminology, code set. In this option, the first pass may map a dictionary term to a corresponding interface terminology term, and it already may be known that that interface terminology term maps to more than one external code set term (mapped either by the system or by the user). As such, the system may present the user with suggested mapping for the dictionary term and/or each of the suggested external codes, prompting the user to select the preferred code for the external code set mapping.

Option (g) also may apply to dictionaries that require mapping to a specific external code set. If the default method row for a given print number group does not have a single, valid external code either by IMO map or customer map, then this filter will show it. This is a very important filter for laboratory dictionaries that assume default codes get applied to method rows as this is the minimum work required for mapping.

Option (h) may apply to terms that were not addressed or analyzed for one reason or another by the system during the first pass. For example, this option may present the user with rows of dictionary terms not yet processed, reviewed, and/or released by the system (presuming a flag indicating that such terms should be released has been set).

Other filters may be available to permit the user to filter the display of rows into smaller divisions. For example, the system may permit filtering based on categories, similar words, codes, etc. Filters applied to the upper grid 18 also may be applied to the control tab 20, e.g. at the "Customer additional data" tab.

Returning to FIG. 2, a status dropdown 22 may refer to and provide filtering based on the user's review status for the terms. Although filtering may not be necessary to complete the reconciliation process, it may be beneficial to the user in order to parse the review process into smaller portions. Thus, the status dropdown 22 may facilitate clarifying and mapping dictionary terms that the system was unable to map. In addition, the user may validate a system mapping, add or change a system mapping, or indicate that there is not a good existing system term and, accordingly, request a new term.

By way of non-limiting example, the user may be able select from among one or more of the following statuses: (a) all; (b) all new concept requests; (c) accepted; (d) not reviewed; (e) mapped; (f) new interface terminology concept needed; (g) not mappable; (h) new concept under review; (i) new concept rejected; (j) more information requested; or (k) new concept approved. As explained below, there may be overlap among the options.

Selecting option (a) may permit the user to view rows in any state of review or processing by the user, except for rows unaddressed by the system.

Option (b) may capture and present the user with all new concept statuses, which may include terms with the corresponding status of "new interface terminology concept needed," "new concept under review," "new concept rejected," "more information requested," or "new concept approved."

Option (c) may present the user with those terms for which the user has agreed with the system decision, i.e., either a mapping or a determination that the term cannot be mapped.

Option (d) may permit the user to view the terms on which that user has not yet acted. In cases where the system was unable to map a term during the first pass, the system may present the user with candidate terms, to the extent that it has determined any. Such presentation may be made, e.g., in the Candidate concepts tab shown in FIG. 2.

Option (e) may present the user with terms for which "custom" mappings have been done for the user. These may be cases where the system was unable to map and a term was found by the user or, based on local understanding, a mapping done by the system was changed upon review by the user.

Option (f) may present the user with dictionary items that were not mapped by the system or by a user's automated reconciliation tool AND for which the user proposes a new description to the system.

Option (g) may permit the user to indicate that a term should be categorized as DNM even if it was mapped by the system. This option also may permit the user to accept a system-generated status of Unclear, Out of Scope, or Invalid Laterality.

Option (h) may present the user with dictionary terms for which a new interface terminology concept is on the way to being approved. Once the approval is complete, the row pertaining to this term may be flagged as "new concept approved" (see Option (k), below).

Option (i) may present the user with dictionary terms for which a new proposed concept has been rejected, e.g., because the proposed concept is a duplicate concept, does not fall in a system-based domain, is not interpretable, or has inappropriate laterality.

Option (j) may present the user with dictionary terms for which a proposed new concept is unclear, i.e., for which more information is required for the system to decide whether to accept or reject the proposal.

Option (k) may present the user with dictionary terms for which a new concept has been approved, although the actual concept approved may not be identical to the description requested.

The system also may present the user with terms flagged with a "Do Not Migrate" status. Accepting this status for a term may remove the term from the reconciliation file, thereby saving the user additional time.

Figure 3:
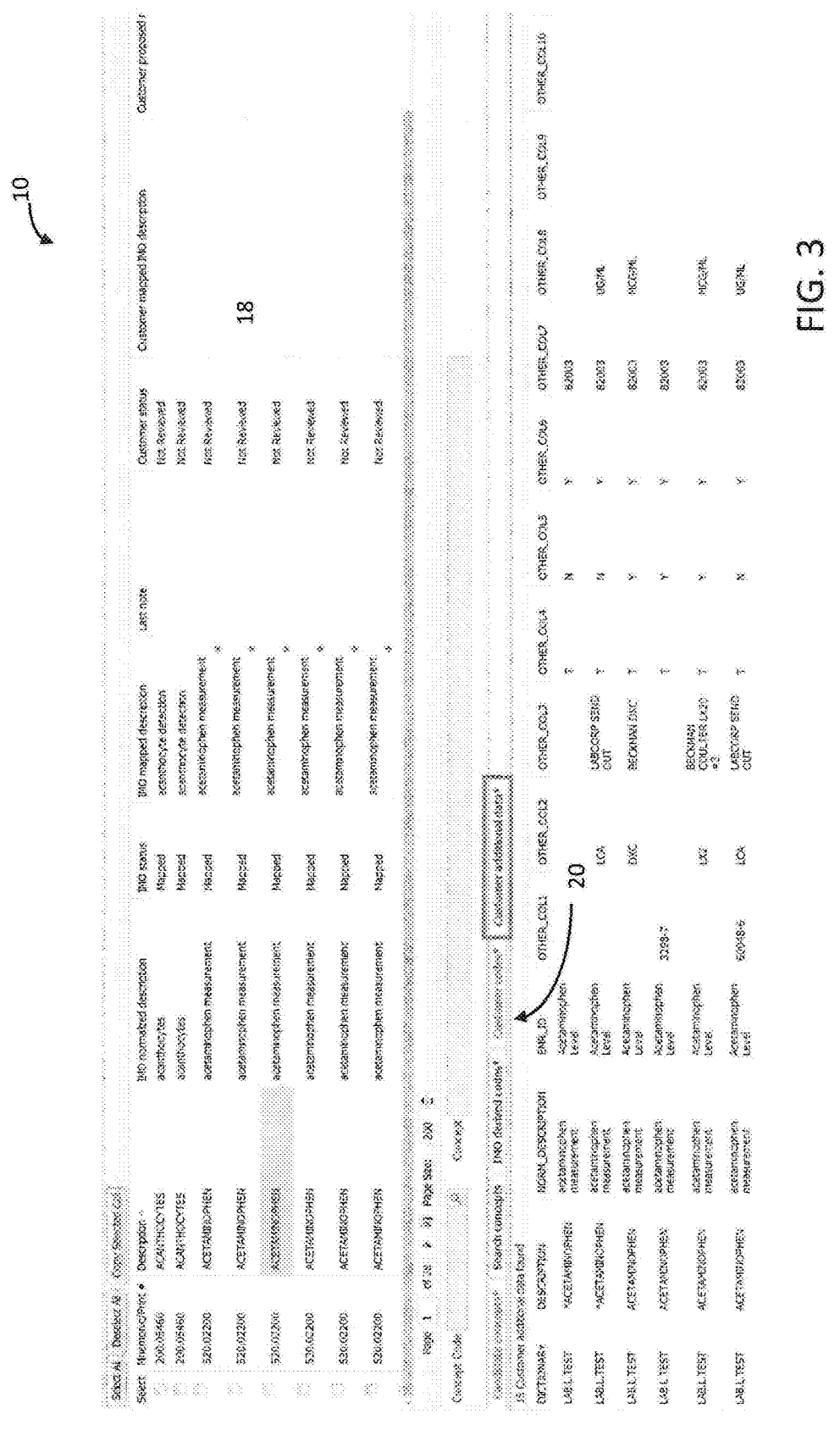

Turning now to FIG. 3, additional system functionality, as illustrated through elements of the control portion 20 of the interface, are shown and described.

FIG. 3 illustrates the mapping tool 10 with a Customer additional data tab in the control portion 20 selected. All rows in the upper grid 18 may have at least one row on the Customer Additional Data tab in the lower region 20, so as to present the user with the suggested mapping, if any exists, or at a minimum to indicate that no such mapping was determined.

To clarify, the data presented in the upper grid 18 may include entries, e.g., rows, for each of the dictionary terms to be mapped. Selecting a row in the upper grid 18 may cause the system to populate one or more rows in the lower region 20, presenting the user with potential mappings to the dictionary mappings. In one aspect, the data populated by the system and displayed in the lower region 20 may include the interface terminology elements that the system determined may map to the selected dictionary term during the first pass, and the interface terminology elements may be one or more descriptions connected to an interface terminology concept. In another aspect, the data populated by the system and displayed in the lower region 20 may include one or more external code values, e.g., administrative, reference, or clinical code values, that the system determined may map to the selected dictionary term, e.g., indirectly via the interface terminology mapping.

In addition, each dictionary term from the user may be exported as part of a row in a database table, and each dictionary row may include additional data associated with it that was provided as part of the original export. Thus, if the user selects a row in the upper grid 18 and an asterisk appears on this tab, the system may be indicating to the user that such additional data exists for that selected dictionary row.

The system may generate and present the user with multiple rows on this tab for a selected row in the processing/upper grid 18. An indicator, e.g., highlighting the row in a different color than the other rows, may reflect the actual associated row. The other rows may relate to dictionary terms that share at least some of the same normalized system description, which may occur when the same dictionary term has different metadata or laterality. Multiple rows may be presented to the user to help distinguish the specific dictionary item being mapped or to present the user with suggested options for modifying the mapping.

Turning now to FIG. 4, the mapping tool 10 is shown with the Customer codes tab selected. As mentioned above, one of the goals may be to map the dictionary terms to external code sets, such as SNOMED CT, LOINC, or CPT. The dictionary terms may have included such mappings prior to the first pass analysis. Selecting the customer codes tab may present the user with such mapping information.

Turning now to FIG. 5, the mapping tool 10 is shown with the IMO, i.e., system, derived codes tab selected. Instead of the user providing mappings to the dictionary terms, the first pass analysis described above may result in mapping a dictionary term to an interface terminology description, with that description associated with maps to one or more elements within those external code sets. Again, examples of the methodology used to determine these mappings may be found in the commonly-owned U.S. publications 2012/0179696 and 2014/0122117.

Such mappings may be presented under this system derived codes tab. This tab also may compile and display code mappings suggested by the user and approved by the system.

The display associated with this tab may include multiple panes. For example, a left pane may show codes associated with the system-mapped description, including the vocabulary (i.e., the relevant code set), the code (usually a numerical or alphanumerical value), description, and whether it is a primary or non-primary map.

A right pane may include codes derived from a customer-mapped description and may apply the same rules as the left pane. If a user overrides a system-mapped description with a customer-mapped description, the customer-mapped description and the codes in the right pane may be passed to the automated reconciliation tool employed by the user in Step 3 of FIG. 1. A user may be able to select (e.g., via a mouse right click) a code from either tab and automatically search for system concepts mapped to that code.

Returning to FIG. 2, the tool may provide the user with suggested maps for multiple dictionary terms in the upper grid 18, marking those maps as "unclear" (or "out of scope") until reviewed and/or verified by the user. In this situation, the user has the option to accept the proposed map or to map the term to a different description in the system vocabulary. Such re-mapping may occur in different ways:

Turning to FIG. 6, a first way to find a system term that means the same thing as the dictionary term is to use the Candidate Concepts tab. The system may include an algorithm to analyze the dictionary term and compare it with interface terminology descriptions to determine probable matches. Variations of the algorithm are possible, but one such algorithm may be the same or substantially similar to the algorithm used by the system to perform the initial mappings.

Possible results may be based upon the normalized description and may be listed in order of strength of match, so the most likely match occurs at the top of the list. Selecting a candidate then may display to the user the system-derived reference code maps that would currently be assigned based on that candidate.

Figure 7:
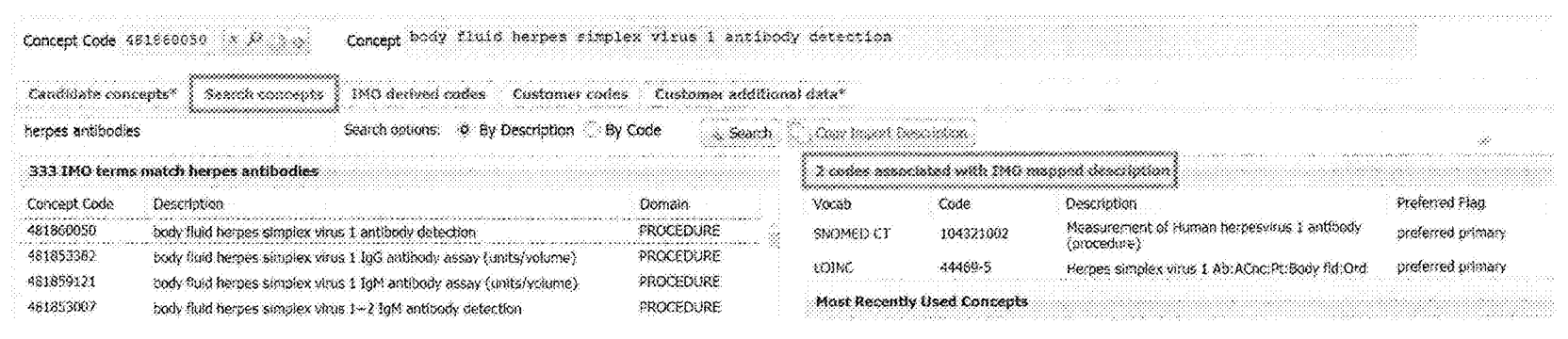

Turning now to FIG. 7, a second way to map a dictionary term may be to search for it within one or more system dictionaries, e.g., via the "Search concepts" tab. Searching may be performed at a description level in order to find a conceptual match within the system dictionary. Searches performed within this tab automatically may search the correct system domain based on the selected dictionary. For example, a Laboratory dictionary may search a Procedure domain, and a problem list or emergency department chief complaint dictionary may search a Problem domain. As mentioned previously, the mapping method may be configured such that only a portion of the user's dictionary is analyzed at a time, and the analyzed portion may coincide with a given interface terminology domain, thereby setting the domain in which searches are performed. Alternatively, the division of the user's dictionary into multiple domains may be pre-determined in consultation with the user to understand the use case for providing terminology mappings for that dictionary.

In addition to searching via concept or description, the user may search via code value. In one aspect, this may be limited to the interface terminology code values. Preferably, however, the search may accept code values for the various external terminologies (e.g., SNOMED CT, ICD-10-CM, LOINC, etc.) to which the interface terminology maps and may search for all interface terminology terms mapped to the desired code.

The following functional requirements may apply to the system. Many of these requirements have been described in greater detail and are summarized below.

Logging in and Administrative Features

To maintain secure access, a customer may be required to enter a username and password to access the system. Access may be tied to a data source, which may be a site or network, in order to prevent unauthorized access. At the same time, there may be no restriction on dictionaries, i.e., if a user has access to the data source, he or she can see all dictionaries within that data source.

One benefit of the system is that multiple users can work on the database at the same time, thereby reducing the overall time for reconciliation. For example, one user may review all terms for which the first pass provided a suggested interface and/or external code set map, while a second user may review all DNM terms. Other divisions of labor are possible as would be appreciated by one of ordinary skill in the art.

The tool may support multiple individual user accounts per customer site and may provide full audit-trail tracking of user actions. Audit tracking may include generating an audit history of changes that have been made, recording, e.g., the name of the user who took the action indicated in the status column and the date/time of the action.

Once a user's final migration file has been generated, the tool automatically may become view-only and disallow modifications to the mapping records.

View of Customer Terms

The tool may provide a grid-type view showing a user's dictionary terms based on a choice of queries. The user may be able to switch between a view of only the DNM entries still to be reviewed and a view that includes all rows. The user also should be able to filter the list based on the dictionary name.

The view may include following data, which may be organized into columns: the dictionary from which the term came; the "mnemonic" (internal identifier for the dictionary entry); the original raw user dictionary term; the normalized import term displayed to the system editors during the migration workflow; a system status column that can have one of the following values: pending, mapped to system concept (may include automatch, manual match-to-existing, and map to new concept), flagged "Unclear," and flagged "Outside Conceptual Scope;" and a default description of the interface terminology concept to which the system has mapped the user term, if such mapping has occurred.

The view also may include a user status indicator, which may reflect one of the following values with respect to each dictionary term: no action yet taken by user, system action accepted; mapped; remapped; or new interface terminology concept needed.

If the user maps a dictionary term to an interface terminology concept, the system may record and present the user with a default description of that interface terminology concept, as well as other descriptions under that concept.

User Actions on Displayed Rows

The user may be able to view all the customer metadata associated with the row in bulk edit. The user also may be able to see all customer codes associated with the row and the default description for the code in bulk edit.

In one aspect, the user may be able flag any row as "system action accepted."

In another aspect, the user may be able flag any row as "New system concept needed." For any row thus flagged, the user may be able to propose a new concept description.

In still another aspect, the user may map any row to an existing system concept. Such mappings may result in the term being mapped to the system concept in the customer's migration file but may or may not add the term as a description for the system concept. To facilitate the mapping, the system may transmit candidate IMO concepts (based on current "candidate concepts" tab in bulk edit but only show the "default description" column; do not show the others) and may receive a user mapping of the row to them. The order in which the concepts may be displayed may default to best matches first, only single row per default description.

Additionally, the system may include a search feature to permit the user to do a text search for interface terminology concepts and then map a selected row to any found concept. The system also may include a search feature that permits the user to search for interface terminology concepts by associated code from one or more external code sets, including, e.g., ICD-9-CM, ICD-10-CM, SNOMED-CT, CPT, and LOINC, and then map the row to any found concept.

The first pass data may be returned to the user for importation into a non-production database, thereby permitting the user to review and make modifications to that data and its mappings without affecting its production database and its operations outside of the data migration. Alternatively, the first pass data may remain on the system for remote access, review, and revision by the user. Once the review and mapping have been completed, the system may export a complete package to the user for importation into an external reconciliation tool and/or for importation into and modification of its production database.

Figure 8:
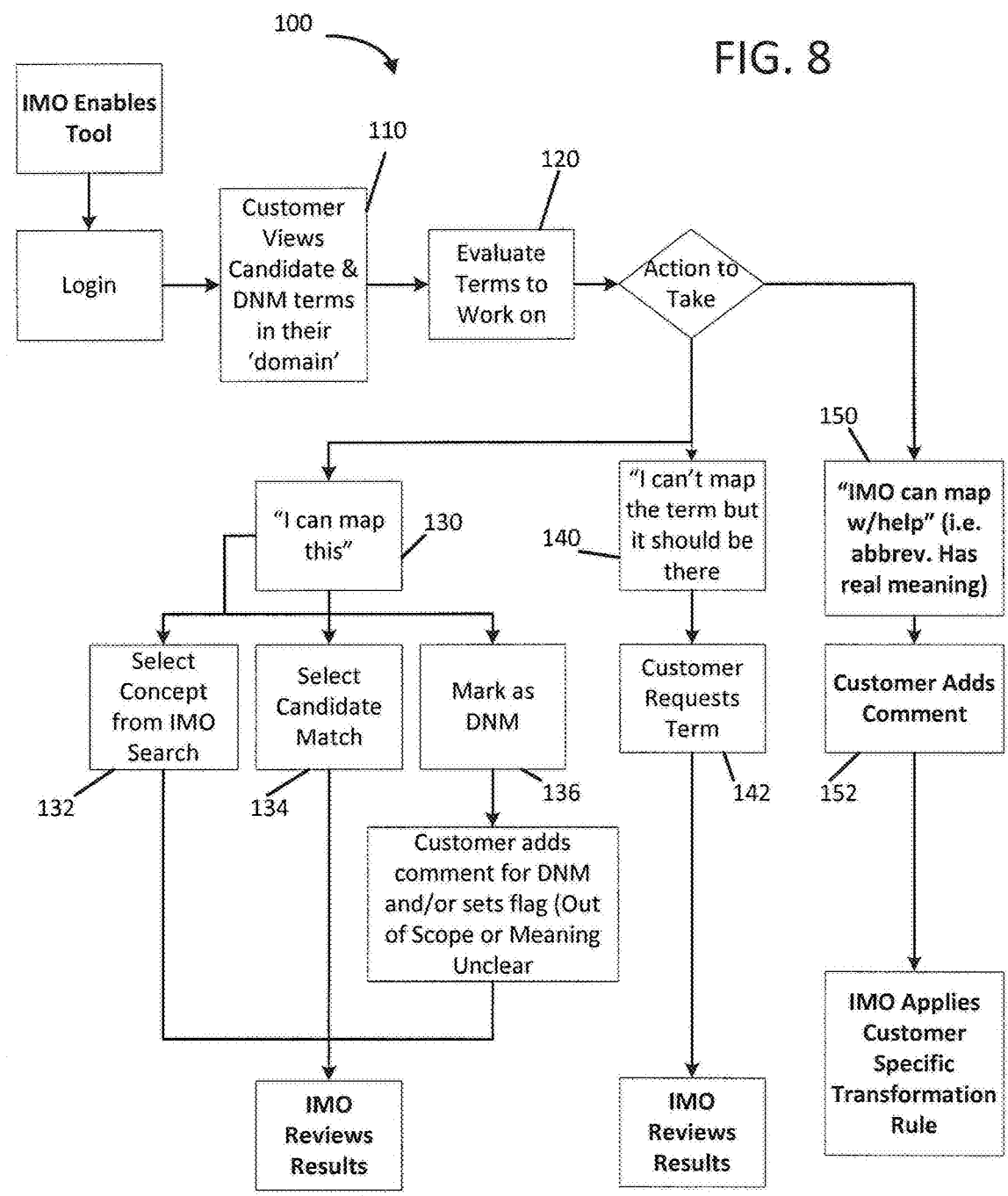
FIG. 8 is a flow-chart depicting user options when presented with data for reconciliation.

Turning now to FIG. 8, a more detailed view of the reconciliation process 100 depicted in FIG. 1 is shown. FIG. 8 begins after the first pass (steps 1 and 2) has occurred, such that the system has generated candidate matches and DNM terms within a domain and has presented at least some of these matches or terms to the user at step 110. The user then may select a subset of terms on which to work, e.g., all DNM terms, all matched terms, all terms, etc. at step 120. The first pass preferably already has generated candidate matches for a large majority of the user's terms, minimizing the number of terms in the DNM category.

At step 130, the user may determine that it is possible to map the dictionary term to an interface terminology or to designate the term as DNM.

At step 132, the system has presented the user with one or more potential matches based on a comparison of the term with the descriptions and/or concepts within an interface terminology domain. To the extent that the dictionary term already has been mapped to an external terminology code, the system also may analyze that mapping to determine its accuracy and/or to use that mapping as an additional factor or a crosscheck for populating its list of potential matches. The user may be able to indicate that the external code sets reflect a source of truth, i.e., the mapping between a dictionary term and an external code is presumed to be true and will be used to determine the mapping of the dictionary term to the interface terminology. In these cases, the system may add rows to a database table, where the interface terminology code may be used as a default description for the concept that may map SAME-AS to the user provided external code.

At step 134, the system receives a user query for one or more descriptions or concepts, searches for a satisfactory match, and then returns one or more matching descriptions or concepts, followed by receiving a user selection of the match from among the query results. In one aspect, at least one of the user's search and the returned results may be descriptions so as to more closely reflect the terminology used by the user. In another aspect, the returned results may be concepts that map to the descriptions that were returned as results.

At step 136, the system already has designated one or more dictionary terms as DNM, and the system receives the user's confirmation of that designation for that term. Alternatively, the system may receive a user designation of DNM for a term for which it proposed a mapping. In either case, the user also may provide a reason or set a flag clarifying the intent behind the DNM designation, e.g., that the term is outside the scope of the domain or that the term's meaning is unclear.

Figure 9:
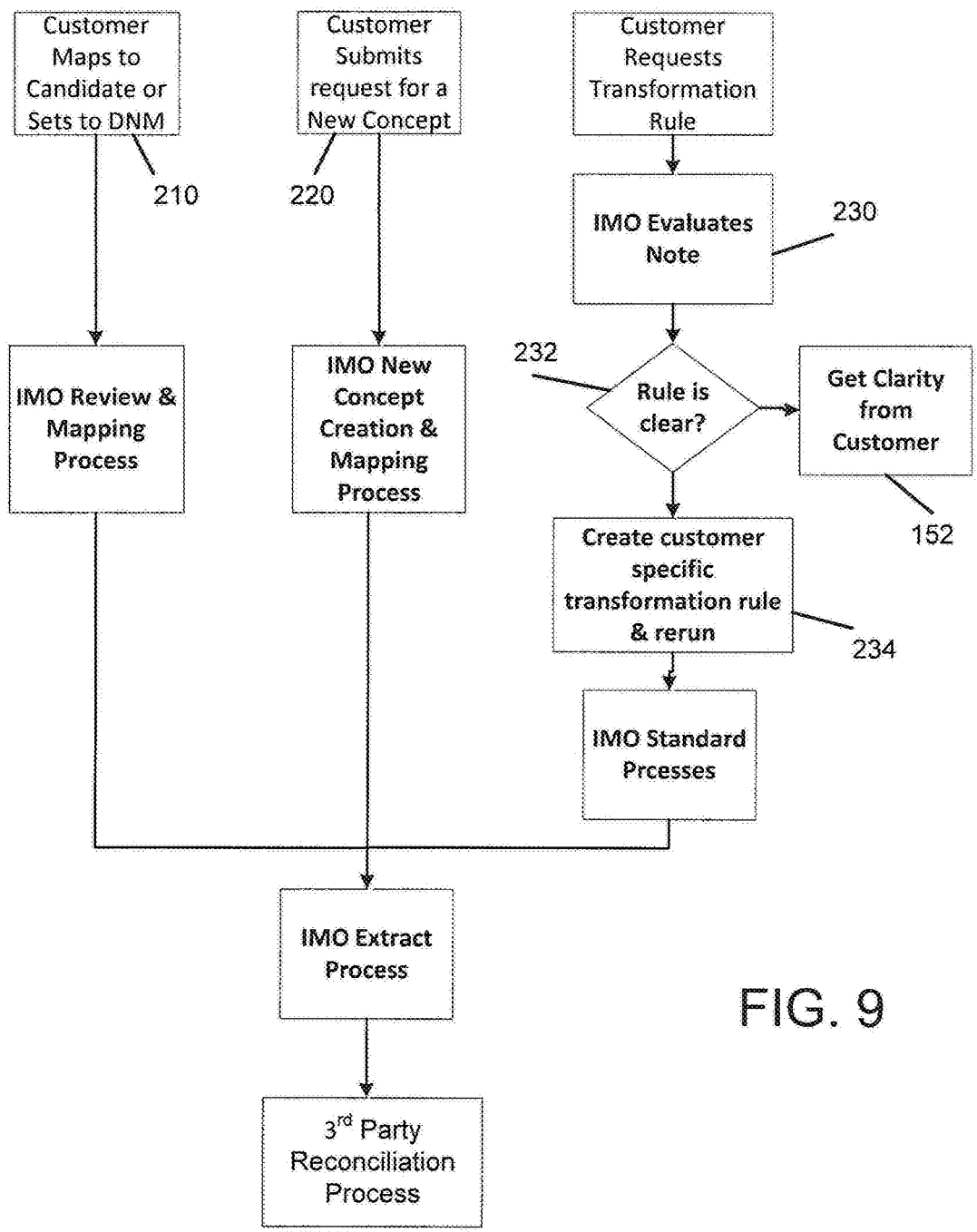
FIG. 9 is a flow chart following from the flow chart of FIG. 8, depicting system options upon receiving user instructions.

The reconciliation process continues in FIG. 9, which depicts action occurring as the process flows back from step 3 to step 2.

At step 210, the system receives the user selection for the candidate match and reviews the selection to verify that it represents a satisfactory match. In the case where the user selection comes from step 132 or 136, this verification may happen automatically and without further analysis. In the case where the user selection comes from step 134, the system may analyze the selected query result and compare it with the dictionary term to determine whether the two items match satisfactorily. For example, the system may compare concepts or descriptions that the first pass determined may correspond to the dictionary term with the concept or description selected by the user to determine whether they are identical, conceptually equivalent, or close enough, which may be determined, e.g., if the two items have words or other metadata in common.

Returning to FIG. 8, at step 140, the user may be presented with a proposed match or a DNM designation for a term, and the user may disagree with that match or designation, although the user may not know what concept or description the term should be mapped to. In one aspect, the user may attempt to find a match using a query similar to the one of step 134, although the system may not return results that the user finds satisfactory. In this situation, the user may request that the system creates a new term at step 142.

At step 220 in FIG. 9, the system may receive this request, and determine whether an existing concept is satisfactory. If not, the system then may determine whether a new description created under an existing concept is satisfactory. If not, the system then may determine whether a new concept is satisfactory and, if so, whether or how that concept relates to other concepts already existing. The system may generate a new concept with a new, unique identifier. It also may generate at least one description related to that concept, including at least preferred primary description, which may be the same text as the new concept. In the event that the dictionary term already includes a link to one or more external codes, the system further may map the new concept to those codes. Additionally or alternatively, the system may map the new concept or description to one or more external codes, e.g., by relying upon the code maps for related descriptions or concepts.

Returning again to FIG. 8, at step 150, the system may present the user with one or more terms that it neither has mapped nor that it designates as DNM. This category may include terms that the system believes should be mapped but for which it has insufficient information to suggest a map or to suggest related descriptions or concepts. For example, the term may be an abbreviation that has real, recognizable meaning to the user but that is not commonly used or otherwise immediately apparent to someone else.

Thus, at step 152, the system may query the user for additional information to explain the term and may receive the user's clarification. Proceeding to step 230 in FIG. 9, the system may evaluate the user's clarification and at step 232 determine whether a match to an existing description or, by extension, a concept, may be made. If not, the system may return to step 152 to prompt the user for still more clarification. If so, the system may map the dictionary term to an existing concept at step 234. The system also may create a new description for that concept, the description corresponding to the dictionary term.

In one aspect, the description may be added to the interface terminology just for the user's mapping. For example, a database table may be created to support user custom maps as well as system custom maps. The system may add a custom map when a user term does not mean exactly the same thing as a user term so that the system cannot map the term to the concept globally. In another aspect, the description may be added to the interface terminology in general so that it is available for mappings from other users' vocabularies.

Staying with FIG. 9, following steps 210,220 and 234, the system may combine the mapped, DNM, new concept, and new description mappings along with their related mappings to the external code sets for exporting back to the user. Once exported back to the user, the user then may decide to cycle the mappings through an external reconciliation tool, e.g., to map non-mapped elements or to verify the mappings created in the preceding steps. In the event that the user reviews the mapped, suggested, and DNM terms, the reconciliation tool preferably is little more than an accepting tool for verifying the mapping work already done. In the event that the user does not review the suggested and/or DNM terms, reconciliation may require significantly more than simply accepting maps, but the mapping tool still will ease the burden on the user by having completed a substantial portion of the dictionary mapping.

One example of the process may include importing a user's dictionary term into the system and mapping that term to an interface terminology concept that, in turn, is mapped to multiple external code set codes. In this example, the user's dictionary requires a preferred external code, such that the system may need to display all of the SAME-AS external code concepts as candidates (and only those).

Thus, in a specific example, a user has a dictionary term of "sodium-serum." The system maps this term to the interface terminology concept "serum sodium measurement" and indicates that it recognizes this mapping as a match. The interface terminology concept may have two external codes mapped to it with a "one-of-these" map types, i.e., neither code is considered a preferred primary. The user dictionary may require a single preferred primary external code, so the system may display both of the external codes mapped to the interface terminology concept and prompt the user to select which should be the preferred term. The system then will receive the user's selection of the appropriate external terminology concept to map its import term to.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

We claim:

1. A method for facilitating data migration from a first vocabulary to a second vocabulary, comprising:
    loading the first vocabulary into a flattened table in a database on a computer;
    determining a domain for which a first set of terms in the first vocabulary belong, wherein an interface terminology comprises a plurality of domains and the domain is one of the plurality of domains;
    modifying the flattened table to include mappings to a subset of the first set of terms to respective terms in the interface terminology, wherein the interface terminology also includes a plurality of unique concepts within each domain and one or more descriptions mapped to each concept wherein each description is an alternative way to express its respective concept, and wherein the descriptions are compared against the subset of the first terms to determine a sufficiency of match;
    flagging, for a user, another subset of the first set of terms as not mapped to respective terms in the interface terminology;
    providing suggested mappings for a plurality of the other subset of terms;

receiving a user indication of a desired mapping for the plurality of the other subset of terms;

modifying the flattened table to include mappings to a first group of the plurality of the other subset of terms to respective terms in the interface terminology;

generating a new interface terminology description for at least one term of the plurality of the other subset of terms, the at least one term not within the first group; and modifying the flattened table to include a mapping to the new interface terminology description to a term in the first vocabulary.

2. A method according to claim 1, further comprising:
exporting each of the mappings to a third party computer system.

3. A method according to claim 1, further comprising:
mapping at least some of the subset of the first set of terms and at least some of the plurality of the other subset of terms to a reference terminology.

4. A method according to claim 1, further comprising:
mapping at least some of the subset of the first set of terms and at least some of the plurality of the other subset of terms to an administrative terminology.

5. A method according to claim 1, further comprising:
mapping at least some of the subset of the first set of terms and at least some of the plurality of the other subset of terms to a clinical terminology.

6. A method according to claim 1, further comprising
mapping at least some of the subset of the first terms and at least some of the plurality of the other subset of terms to a reference terminology, an administrative terminology, and a clinical terminology;
wherein the domain is determined based on an identification of the reference, administrative, or clinical terminology.

7. A method according to claim 1, wherein the first vocabulary is extracted from an electronic health record.

8. A method according to claim 1, wherein the new interface terminology description is a description that relates to an existing interface terminology concept.

9. A method according to claim 1, wherein the new interface terminology description is a description that relates to a newly-generated interface terminology concept.

10. A method according to claim 1, further comprising:
presenting the user with a web-based, user-facing interface that includes a first portion displaying a plurality of terms in the first vocabulary and a second portion responsive to a user selection in the first portion,
wherein the providing step includes the second portion displaying suggested interface terminology mappings for the selected term; and
wherein the receiving step includes receiving a user selection of one of the suggested interface terminology mappings or a user-suggested mapping.

11. A method for facilitating data migration from a first healthcare vocabulary to a second healthcare vocabulary, comprising:

presenting a user with a web-based, user-facing interface that includes a first portion displaying a plurality of terms in the first vocabulary and a second portion responsive to a user selection in the first portion, providing, in the second portion, suggested interface terminology mappings for the selected term, wherein at least some of the suggested interface terminology mappings are determined by receiving a user input of one or more external healthcare terminology terms or external healthcare terminology term identifiers from an external healthcare terminology that includes both terms and term identifiers, and further wherein the external healthcare terminology terms or external healthcare terminology term identifiers are mapped to terms in the interface terminology;

receiving a user selection of one of the suggested interface terminology mappings or a user-suggested mapping;

confirming the user selection or user-suggested mapping; and when confirming a user-suggested mapping, adding a new interface terminology description and a map between the new interface terminology description and the selected term to a flattened table database.

12. A method according to claim 11, further comprising:
mapping a subset of the first healthcare vocabulary to respective terms in an interface terminology prior to the presenting step.

13. A method according to claim 11, further comprising:
prior to the presenting step, flagging a subset of the first healthcare vocabulary as not mapped to respective terms in the interface terminology.

14. A method according to claim 11, further comprising:
analyzing, by a computer, terms of the first healthcare vocabulary stored in a database, to determine to which domain of the interface terminology those terms of the first healthcare vocabulary belong.

15. A method according to claim 11, wherein the new interface terminology description is added for use in mapping just for that user's first healthcare vocabulary library.

16. A method according to claim 11, wherein the new interface terminology description is added for use in mapping multiple users' libraries.

17. A method according to claim 11, further comprising mapping at least some of the first healthcare vocabulary terms to reference terminology terms, via interface terminology mappings.

18. A method according to claim 11, further comprising mapping at least some of the first healthcare vocabulary terms to administrative terminology terms, via interface terminology mappings.

19. A method according to claim 11, further comprising mapping at least some of the first healthcare vocabulary terms to clinical terminology terms, via interface terminology mappings.

* * * * *